(12) United States Patent
Ozaki et al.

(10) Patent No.: US 8,389,179 B2
(45) Date of Patent: Mar. 5, 2013

(54) FUEL CELL

(75) Inventors: Toru Ozaki, Chiba (JP); Fumiharu Iwasaki, Chiba (JP); Kazutaka Yuzurihara, Chiba (JP); Takafumi Sarata, Chiba (JP); Tsuneaki Tamachi, Chiba (JP); Norimasa Yanase, Chiba (JP); Noboru Ishisone, Chiba (JP)

(73) Assignee: Seiko Instruments Inc. (JP)

( * ) Notice: Subject to any disclaimer, the term of this patent is extended or adjusted under 35 U.S.C. 154(b) by 538 days.

(21) Appl. No.: 12/450,048

(22) PCT Filed: Jul. 3, 2008

(86) PCT No.: PCT/JP2008/062027
§ 371 (c)(1),
(2), (4) Date: Nov. 9, 2009

(87) PCT Pub. No.: WO2009/008316
PCT Pub. Date: Jan. 15, 2009

(65) Prior Publication Data
US 2010/0104911 A1    Apr. 29, 2010

(30) Foreign Application Priority Data

Jul. 10, 2007  (JP) .................................. 2007-181265

(51) Int. Cl.
*H01M 8/04*  (2006.01)
(52) U.S. Cl. ....................................................... 429/513
(58) Field of Classification Search .................. None
See application file for complete search history.

(56) References Cited

FOREIGN PATENT DOCUMENTS

| | | |
|---|---|---|
| EP | 1777770 | 4/2007 |
| JP | 62017962 | 1/1987 |
| JP | 63181271 | 7/1988 |
| JP | 1281682 | 11/1989 |
| JP | 4121969 | 4/1992 |
| JP | 4289674 | 10/1992 |
| JP | 6 60903 | 3/1994 |
| JP | 9161828 | 6/1997 |
| JP | 2007122999 | 5/2007 |
| JP | 2008226811 | 9/2008 |

*Primary Examiner* — Patrick Ryan
*Assistant Examiner* — Wyatt McConnell
(74) *Attorney, Agent, or Firm* — Adams & Wilks

(57) ABSTRACT

A fuel cell has cell units and a manifold for uniformly supplying an anode fluid to the cell units. The manifold has a fluid supply plate with a flow conduit for feeding an anode fluid, and a plate structure having a flow space and openings arranged in a preselected direction. The flow space receives an anode fluid fed from an opening part of the flow conduit, reduces a flow rate of the anode fluid, and disperses the anode fluid at the reduced flow rate along a plane direction orthogonal to the preselected direction. The block group is arranged between the openings and the opening part so that the flow space is disposed between the block group and the opening part. The block group comprises blocks spaced apart from one another to form paths for dispersing into the openings the anode fluid dispersed by the flow space at the reduced rate.

20 Claims, 11 Drawing Sheets

FUEL CELL

CROSS-REFERENCE TO RELATED APPLICATIONS

This application is a U.S. national stage application of International Application No. PCT/JP2008/062027 filed Jul. 3, 2008, claiming a priority date of Jul. 10, 2007, and published in a non-English language.

BACKGROUND OF THE INVENTION

Technical Field

The present invention relates to a fuel cell that feeds an anode fluid from a manifold to each cell unit of a cell stack.

BACKGROUND OF THE INVENTION

Due to the upsurge of recent energy issues, an electric source with a higher energy density and with cleaner discharge has been demanded. A fuel cell is a generator with an energy density several fold those of existing batteries. A fuel cell has characteristic features of higher energy efficiency and little or no nitrogen oxides or sulfur oxides in discharged gases. Therefore, a fuel cell is an extremely effective device satisfying the demand as a next-generation electric source device.

The cell of a fuel cell comprises an anode-side catalyst (anode) and a cathode-side catalyst (cathode) on both the sides of the solid polymer electrolyte membrane as an electrolyte membrane. By alternately arranging a separator with an anode fluid path and a cathode fluid path formed thereon while these paths sit back to back and the cell, a cell unit is formed. By stacking a plurality of such cell units together, then, a cell stack is constructed. A fuel cell of such stack structure is equipped with a manifold for uniformly dividing a fuel to each of the cell units to uniformly feed the fuel in the cell stack, so as to feed the fuel from the manifold to each of the cell units.

When the fuel is fed non-uniformly to each of the cell units in the cell stack, the output from each of the cell units varies, leading to the reduction of the power generation, so that the output from the whole cell stack is affected by the output from a low-output cell unit. Therefore, it is demanded that such manifold should have a uniform division performance at a higher dimension for the fuel supply to each of the cell units in the cell stack.

In such circumstances, various techniques for uniformly feeding a fuel to each of the cell units in a cell stack have been proposed (the publication of JP-A-Hei 9-161828). For fuel supply, in the publication, the manifold is constructed with a second space for dispersion, which is arranged adjacent to the cell stack, and a first space where a hydrogen rich gas is fed. The hydrogen rich gas fed in the first space is transferred through a through hole to the second space, where the hydrogen rich gas is dispersed and fed to each of the cell units.

Because the hydrogen rich gas is dispersed in the second space, the variation in the feed volume between cell units close to the through hole and cell units remote from the through hole is reduced, so that the hydrogen rich gas can be fed uniformly to all the cell units in the cell stack.
Patent reference 1: JP-A-Hei 9-161828

Because the hydrogen rich gas is necessarily dispersed in the second space according to the conventional technique, it was required to make the ratio of the volume of the second space to the whole volume of the first space and the second space larger. Unless the distance from the through hole to the cell units is at a certain dimension, therefore, the feed volume of the hydrogen rich gas varies depending on the positional relation between the through hole and each of the cell units, so that the manifold should inevitably be made as a larger type so as to uniformly feed the hydrogen rich gas to each of the cell units.

In such circumstances, the invention has been achieved. It is an object of the invention to provide a fuel cell capable of uniformly feeding an anode fluid to each of the cell units even when the manifold is made as a small type.

SUMMARY OF THE INVENTION

So as to attain the object, in a first aspect of the invention, a fuel cell comprises a cell with an anode and a cathode connected together through an electrolyte membrane, a cell stack where a plurality of a cell unit with a separator equipped with an anode fluid path and the cell are laminated together, and a manifold for feeding an anode fluid to a position of the cell unit where the anode fluid path faces, characterized in that the manifold comprises a bottom plate equipped with a plurality of small openings facing the anode fluid path, a top plate where the flow space of the anode fluid is formed in the inside between the upper face of the bottom plate and the top place, and a fluid supply plate equipped with a flow conduit for feeding an anode fluid from the side part of the flow space along the face direction into the flow space; that a block group forming paths for dispersing the anode fluid fed from the flow conduit into the small openings is formed on the upper face of the bottom plate between the opening part of the flow conduit of the fluid supply plate into the flow space and the small openings; the flow rate of the anode fluid fed from the flow conduit of the fluid supply plate is reduced in the flow space, and the anode fluid at a reduced flow rate is allowed to influx the paths in the block group to be dispersed in the small openings.

Due to such characteristic feature, the anode fluid fed from the side face of the flow space along the face direction through the flow conduit of the fluid supply plate is fed into the flow space to reduce the flow rate of the anode fluid and the anode fluid at a reduced flow rate is allowed to influx the paths in the block group to be dispersed in the small openings. Therefore, the anode fluid can be dispersed in a plurality of the small openings in such a limited space of the manifold of a thin type, so that the anode fluid can uniformly be fed to each of the cell units, even when the manifold is made as a thin type.

In a second aspect of the invention, further, a fuel cell is characterized in that the paths formed with the block group are plurally formed and the width of such paths remote from the opening part of the flow conduit into the flow space is larger than the width of such paths close to the opening part of the flow conduit into the flow space.

Owing to such characteristic feature, the width of the paths remote from the opening part to which the anode fluid is fed is larger, so that the flow resistance in such remote paths is reduced for ready flowing. Thus, the anode fluid can be fed uniformly from a plurality of the paths into the small openings, despite the distances thereof from the opening part.

In a third aspect of the invention, further, a fuel cell is characterized in that the paths formed with the block group are plurally formed and the length of such paths remote from the opening part of the flow conduit into the flow space is shorter than the length of such paths close to the opening part of the flow conduit into the flow space.

Owing to such characteristic feature, the loss of the flow pressure in the remote paths is reduced for ready flowing because the length of the paths remote from the opening part of the flow conduit into the flow space where the anode fluid is fed is shorter, so that the anode fluid can uniformly be fed from a plurality of the paths into the small openings, despite the distances thereof from the opening part.

In a fourth aspect of the invention, a fuel cell is characterized in that a separator plate is arranged in such a manner that the separator plate separates the flow space through the block group on the opposite side of the small openings into a plurality of spaces along the direction of the small openings arranged and additionally divides the anode fluid into a plurality of the spaces.

Due to such characteristic feature, the anode fluid can be dispersed at a uniform state into a plurality of the small openings since the separator plate divides the anode fluid in a plurality of the spaces.

In a fifth aspect of the invention, a fuel cell is characterized in that a separator wall for separating the flow space through the block group on the opposite side of the small openings is arranged along the direction of the small openings arranged, where the opening part of the flow conduit into the flow space is formed in a manner corresponding to a plurality of the spaces separated with the separator wall.

Due to such characteristic feature, the anode fluid can be transferred from the opening parts corresponding to a plurality of the spaces into a plurality of the spaces, so that the anode fluid can be dispersed in a plurality of the small openings in a secure and uniform manner.

In a sixth aspect of the invention, further, a fuel cell is characterized in that a block group and a fluid supply plate are additionally arranged on the bottom plate through the small openings on the opposite side of the block group and the fluid supply plate, along the face direction thereof.

Due to such characteristic feature, the anode fluid flowing in the paths between the block groups on both the sides of the small openings can be fed, so that the flow pressure of the anode fluid into the small openings can be raised to feed the anode fluid into the small openings.

In a seventh aspect of the invention, additionally, the opening parts of the flow conduits facing each other into the flow space are arranged in an inversed direction to each other along the direction of the small openings arranged.

Due to such characteristic feature, additionally, the anode fluid can be fed from the opening parts arranged in an inversed direction to each other along the direction of the small openings arranged, so that the feed distribution of the anode fluid along the direction of the small openings arranged can be suppressed.

In an eighth aspect of the invention, additionally, a fuel cell is characterized in that the small openings are arranged in such a manner that the small openings close to the opening parts of the flow conduits into the flow space are more apart from the block group lying between the opening parts and the small openings than the small openings remote from the opening parts.

Due to such characteristic feature, the micro openings are arranged at a slanting state between the block groups, so the feed distribution of the anode fluid can further be suppressed.

In a ninth aspect of the invention, further, a fuel cell is characterized in that a plurality of small openings facing the anode fluid path are arranged on the top plate and the cell stacks are individually arranged on the bottom part of the bottom plate and the top part of the top plate.

Due to such characteristic feature, the cell stacks are arranged on both the sides of the manifold, while the manifold lies between the cell stacks. Therefore, the anode fluid can be fed from the manifold of a thin type to many cells.

DETAILED DESCRIPTION OF THE INVENTION (First Embodiment)

A first embodiment is now described with reference to FIGS. 1 through 4.

Figure 1:
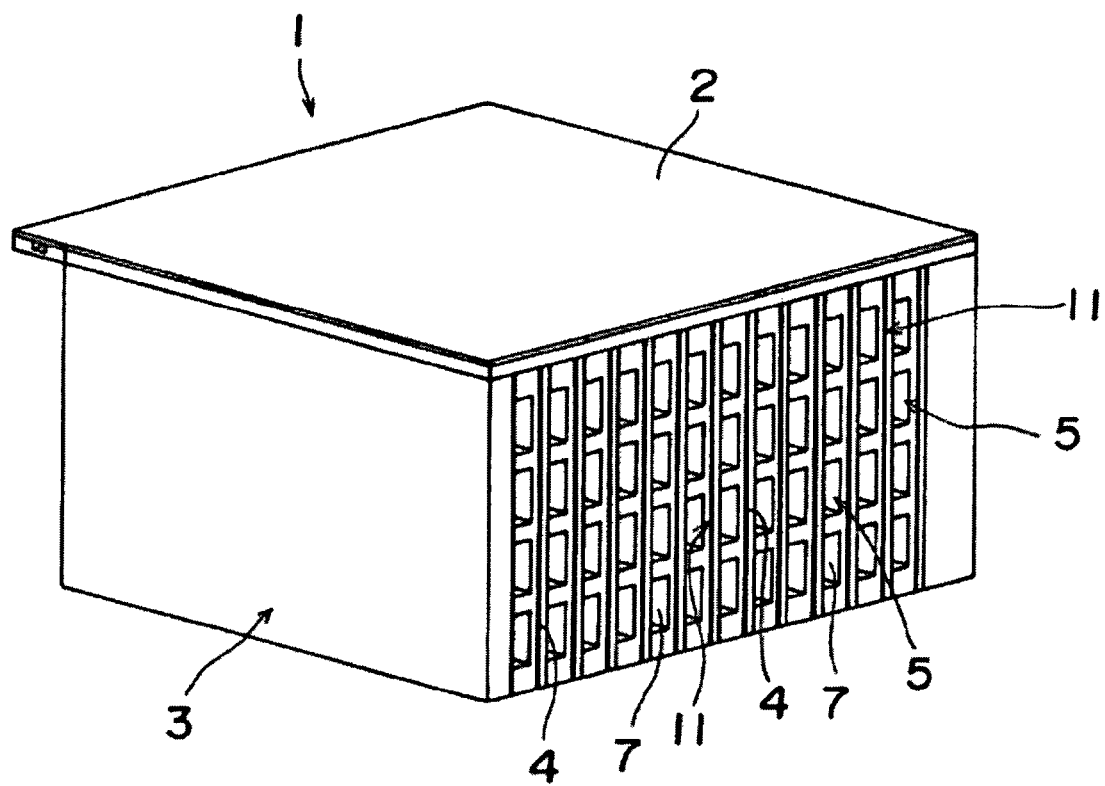
FIG. 1 is a view of the appearance of a fuel cell in a first embodiment.
Figure 2:
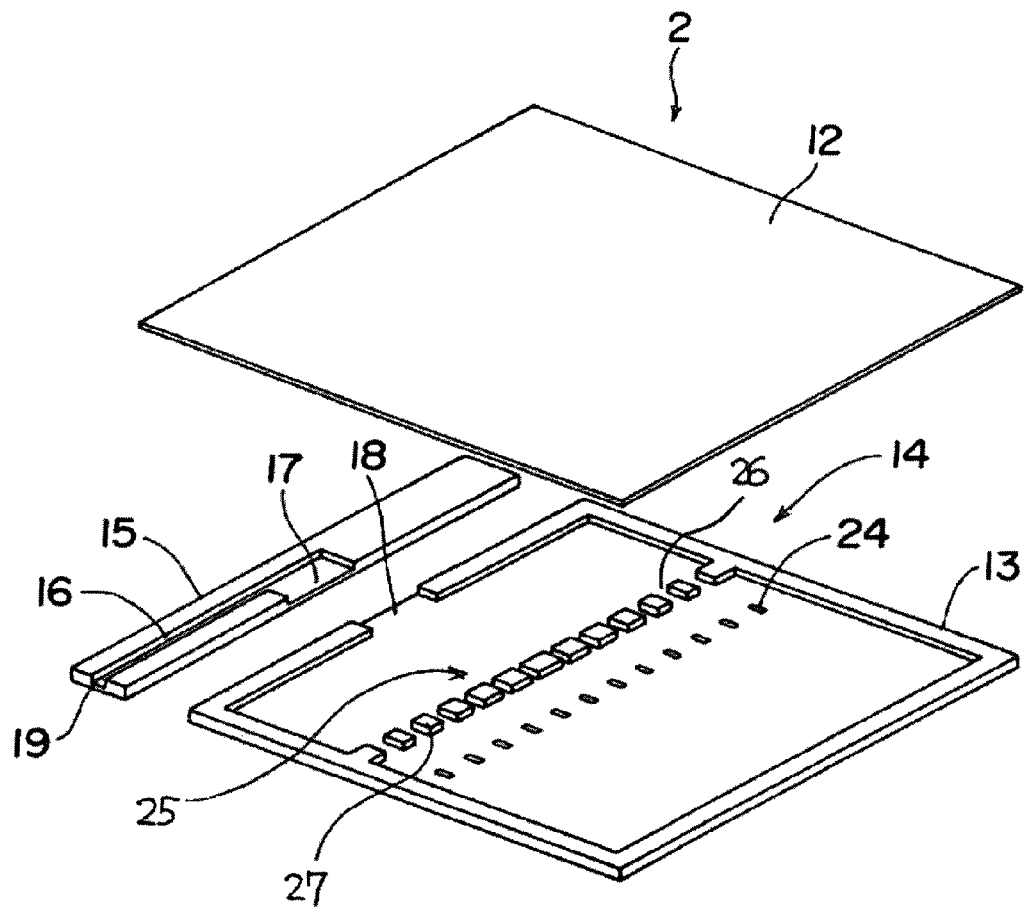
FIG. 2 is a perspective view of the decomposed outer manifold.
Figure 3:
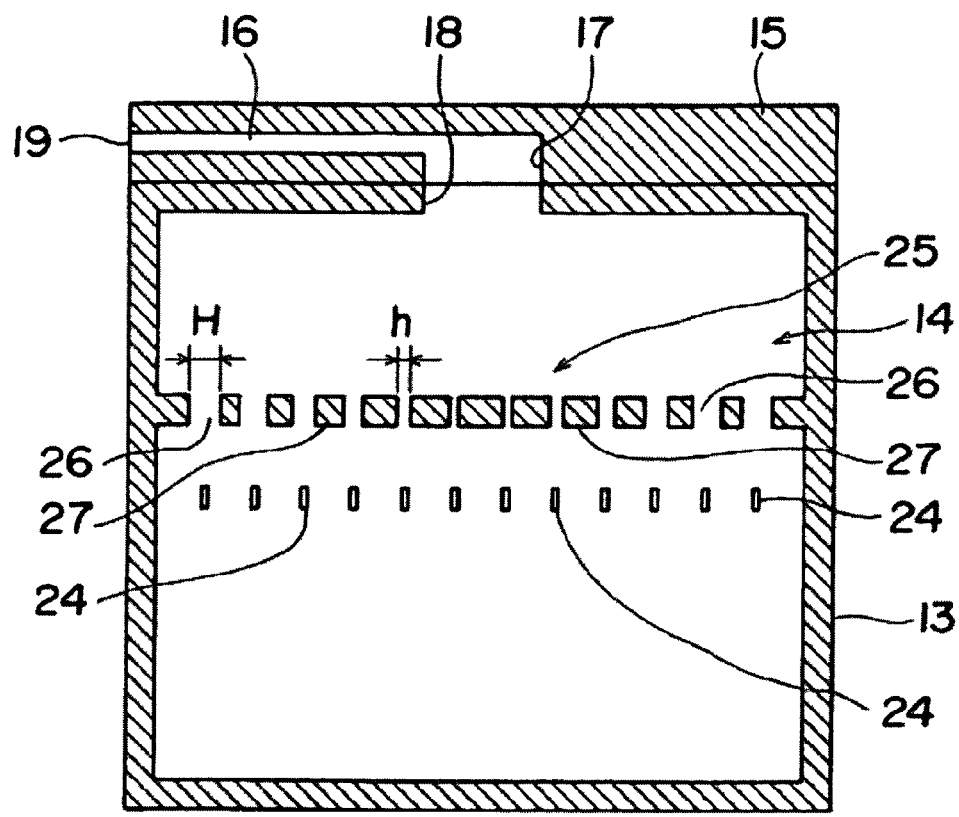
FIG. 3 is a view of the appearance of the inner face of the bottom plate.
Figure 4:
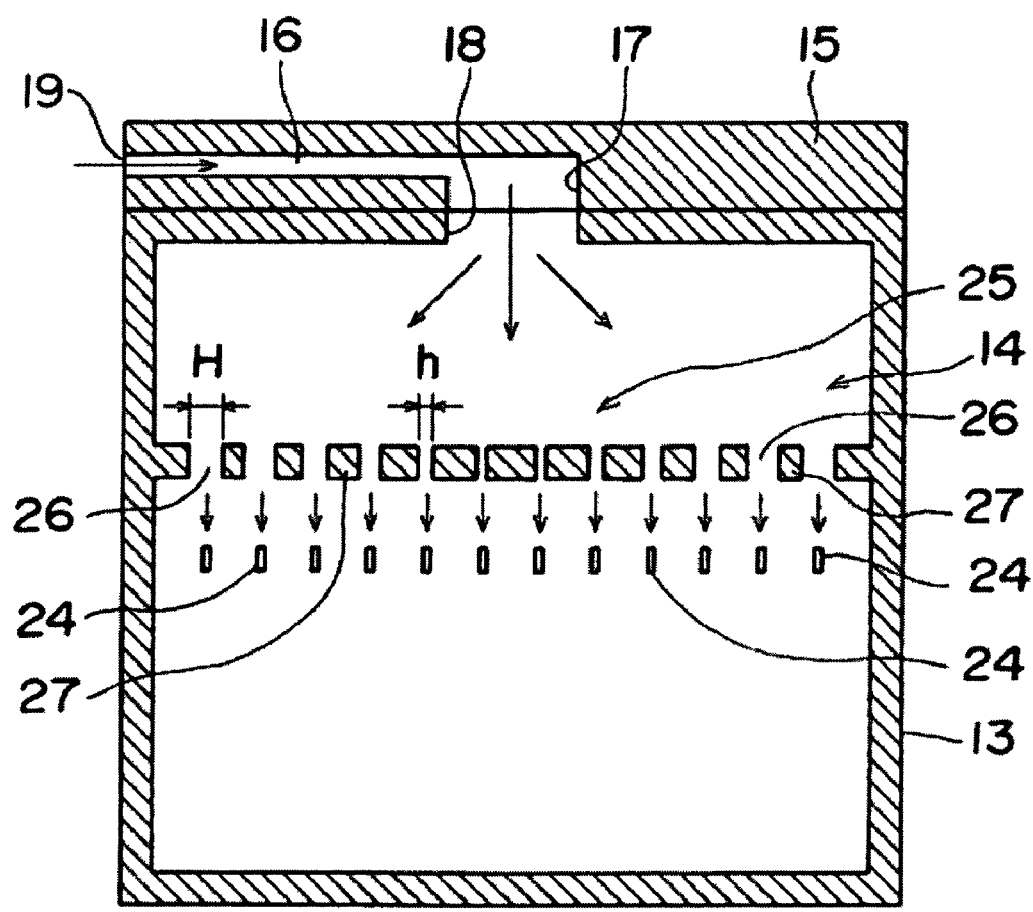
FIG. 4 is a view of the appearance of the inner face of the bottom plate, depicting the flow status of a fuel flowing on the bottom plate.

FIG. 1 is a view of the appearance of a fuel cell in the first embodiment; FIG. 2 is a perspective view of the decomposed outer manifold; and FIG. 3 shows the appearance of the inner face of the bottom plate; and FIG. 4 shows the status of a fuel flowing on the bottom plate.

As shown in the figures, a fuel cell 1 in this mode is equipped with an outer manifold 2 as a manifold for feeding a fuel (hydrogen) as an anode fluid, where hydrogen is fed from the outer manifold 2 to a cell stack 3. The outer manifold 2 is connected with a fuel supply part not shown in the figures, for feeding hydrogen obtained from for example a hydrogen-absorbing alloy, while a control circuit not shown in the figures is connected with the electricity generation part of the cell stack 3.

The cell 4 of the cell stack 3 is a membrane electrode assembly, where an anode-side catalyst (anode) and a cathode-side catalyst (cathode) are equipped on both the sides of a solid polymer electrolyte membrane as an electrolyte membrane. Then, a cell unit 11 is formed by alternately stacking a separator 5 with an anode fluid path (not shown in the figures) and a cathode fluid path 7 formed at a state of their sitting back to each other and the cell 4. The cell stack 3 is constructed by stacking together a plurality of the cell unit 11. So as to uniformly feed hydrogen in the cell stack 3 by uniformly dividing hydrogen in the anode fluid path of the separator 5 stacked in each cell unit 11 in the fuel cell 1 of such stack structure, an outer manifold 2 is equipped.

Herein, the separator 5 is not limited to the shape where the anode fluid path and the cathode fluid path 7 are formed at a state of their sitting back to back. The separator may be in any shape where the anode fluid can be fed to the anode and the cathode fluid can be fed to the cathode.

The outer manifold 2 is now described below with reference to FIGS. 2 through 4.

As shown in FIG. 2, the outer manifold 2 comprises a top plate 12 and a bottom plate 13, where a hydrogen flow space 14 is formed between the inner face of the top plate 12 and the upper face of the bottom plate 13. A fluid supply plate 15 is arranged on the side part of the bottom plate 13 along the face direction at a state such that the fluid supply plate and the bottom plate are on the same face, while a flow conduit 16 for feeding hydrogen into the flow space 14 from the side part of the flow space 14 along the face direction is formed on the fluid supply plate 15. The top plate 12 is arranged over the bottom plate 13 and the fluid supply plate 15, while the flow conduit 16 is arranged between the inner face of the top plate 12 and the upper face of the fluid supply plate 15.

An opening part 17 with an opening on the side of the flow space 14 is arranged in the flow conduit 16, and the opening part 17 is in communication with the influx part 18 on the bottom plate 13. The end of the flow conduit 16 is a fuel supply port 19. The fuel supply port 19 is connected with a fuel supply part not shown in the figure.

As shown in FIGS. 2 and 3, a plurality of small openings 24 (12 small openings in the depicted example) facing the anode fluid path of the cell unit 11 (see FIG. 1) are arranged on the upper face of the bottom plate 13. The small openings 24 are arranged in an array in such a manner that one or more such small openings 24 can be arranged in one cell unit 11 (see FIG. 1).

In the depicted example, the small openings 24 are formed in an array of 12 small openings. A great number of small openings 24 may be formed for example by forming two or more such arrays, each array comprising 12 small openings.

A block group 25 is formed between the influx part 18 and the small openings 24 on the upper face of the bottom plate 13, so that the block group 25 forms paths 26 for dispersing hydrogen fed from the influx part 18 into the small openings 24.

As shown in FIG. 4, a plurality of blocks 27 is arranged in the block group 25, while the spaces between the blocks 27 are the paths 26. The blocks are arranged in such a manner that the width of blocks 27 close to the influx part 18 (the opening part 17 of the flow conduit 16) is larger than the width of blocks 27 remote from the influx part 18 (the opening part 17 of the flow conduit 16). In other words, the width H of the paths 26 remote from the influx part 18 (the opening part 17 of the flow conduit 16) is larger than the width h of the paths 26 close to the influx part 18 (the opening part 17 of the flow conduit 16), so that the pressure loss in the paths 26 remote from the influx part 18 (the opening part 17 of the flow conduit 16) is reduced.

A prevention wall preventing the efflux of hydrogen into the opposite side of the influx part 18 of hydrogen may be arranged through the small openings 24, on the opposite side of the block group 25, to securely retain the pressure for hydrogen supply into the small openings 24.

Because the width H of the paths 26 remote from the influx part 18 (the opening part 17 of the flow conduit 16) is larger than the width h of the paths 26 close to the influx part 18 (the opening part 17 of the flow conduit 16), hydrogen flowing from the paths 26 into the small openings 24 can be divided at a uniform volume, despite the distances from the opening part 17 of the flow conduit 16. Hydrogen uniformly divided in the small openings 24 flows downward (along the direction crossing with the flow direction in the paths 26) from the small openings 24 to be fed into the anode fluid path of each cell unit 11 (see FIG. 1).

As shown in FIG. 4, hydrogen is fed from the fuel supply port 19 of the fluid supply plate 15 in the outer manifold 2, which is then transferred from the flow conduit 16 through the opening part 17 and the influx part 18 to the flow space 14, for dispersion along the plane direction. Hydrogen at a reduced flow rate due to the dispersion in the flow space 14 is divided in a plurality of the paths 26 in the block group 25 for flowing.

As described above (as shown in FIG. 3) as to a plurality of the paths 26, the width H of the paths 26 remote from the opening part 17 of the flow conduit 16 is larger than the width h of the paths 26 close to the opening part 17 of the flow conduit 16, so that hydrogen transferred is uniformly divided in the paths 26 despite the distances from the opening part 17 of the flow conduit 16. Hydrogen uniformly divided in the paths 26 flows downward (along the direction crossing with the flow direction in the paths 26) to be fed to the anode fluid path of the cell unit 11 (see FIG. 1).

In the fuel cell 1 feeding hydrogen through the outer manifold 2 to the cell stack 3, therefore, hydrogen fed from the side part along the face direction into the flow space 14 is dispersed in the flow space 14 and then divided uniformly in the paths 26 in the block group 25, so that the hydrogen flowing in the paths 26 is at such a uniform volume that hydrogen is transferred into the small openings 24. Accordingly, hydrogen can be fed uniformly to each cell unit in a manifold of a thin type, with no need for a manifold having a larger thickness, for example via the arrangement of a large dispersion space to make a large-type manifold.

Second Embodiment

Figure 5:
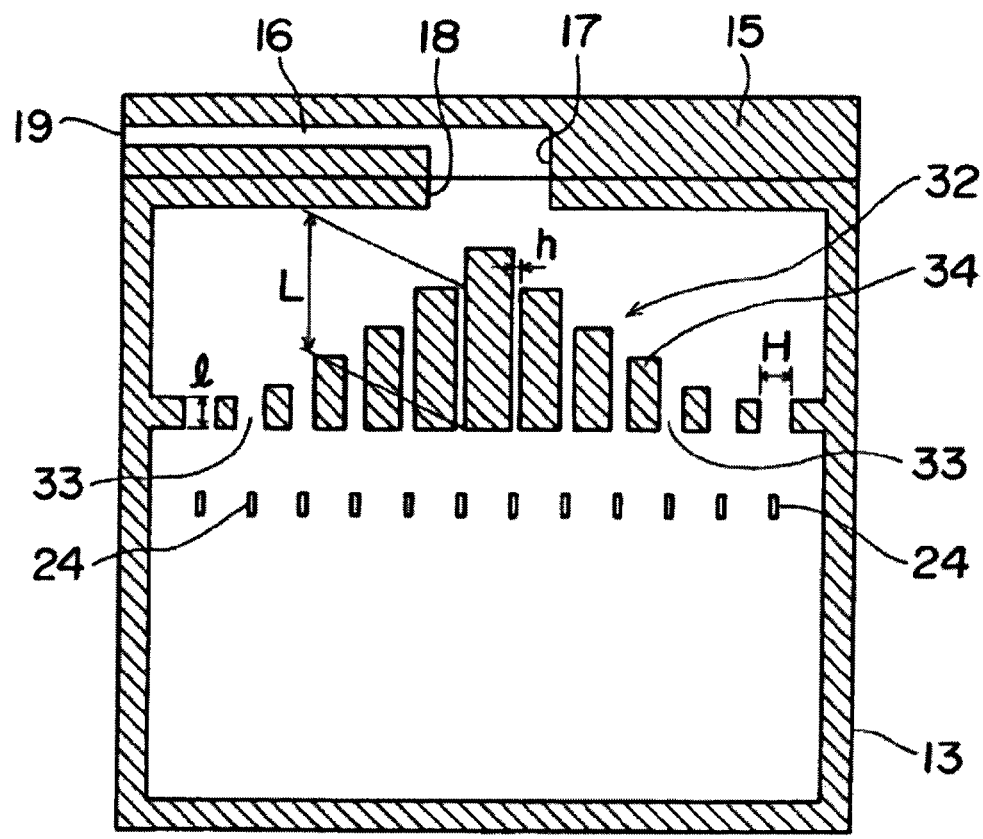
FIG. 5 is a view of the appearance of the inner face of the bottom plate of the outer manifold in a fuel cell in a second embodiment.

With reference to FIG. 5, a second embodiment is described below.

FIG. 5 shows the appearance of the inner face of the bottom plate of the outer manifold in a fuel cell in the second embodiment. The members except for the bottom plate 13 are the same as those in the first embodiment. The same members as the members for the bottom plate 13 shown in FIG. 3 (the first embodiment) are marked with the same symbols. Accordingly, overlapping descriptions are skipped.

As shown in the figure, a block group 32 is formed between the influx part 18 and the small openings 24 on the upper face of the bottom plate 13. The block group 32 forms paths 33 for dispersing hydrogen fed from the communication hole 23 into the small openings 24. A plurality of blocks 34 are arranged in the block group 32, and the spaces between the blocks 34 are the path 33.

The width (along the left and right direction in the figure) of the blocks 34 close to the influx part 18 (the opening part 17 of the flow conduit 16) is larger than the width of the blocks 34 remote from the influx part 18 (the opening part 17 of the flow conduit 16). In other words, the width H of the paths 33 remote from the influx part 18 (the opening part 17 of the flow conduit 16) is larger than the width h of the paths 33 close to the influx part 18 (the opening part 17 of the flow conduit 16), so that the pressure loss in the paths 33 remote from the influx part 18 (the opening part 17 of the flow conduit 16) is reduced.

Additionally, the length (along the upper and down direction in the figure) of the blocks 34 close to the influx part 18 (the opening part 17 of the flow conduit 16) is larger than the length of the blocks 34 remote from the influx part 18 (the opening part 17 of the flow conduit 16). In other words, the length l of the paths 33 remote from the influx part 18 (the opening part 17 of the flow conduit 16) is shorter than the length L of the paths 33 close to the influx part 18 (the opening part 17 of the flow conduit 16), so that the pressure loss in the paths 33 remote from the influx part 18 (the opening part 17 of the flow conduit 16) is reduced.

It is possible to modify only the length of the paths while equally retaining the width of a plurality of the blocks 34 in the block group 32 to make the width of the resulting paths equal.

By modifying the width and length of the paths 33, further, hydrogen flowing from the paths 33 into the small openings 24 is divided at a uniform volume, despite the distance of the flow conduit 16 from the opening part 17. Hydrogen uniformly divided in the small openings 24 flows downward (along the direction crossing with the direction of the influx the paths 33) from the small openings 24 to be fed into the anode fluid path of each cell unit 11 (see FIG. 1).

Third Embodiment

Figure 6:
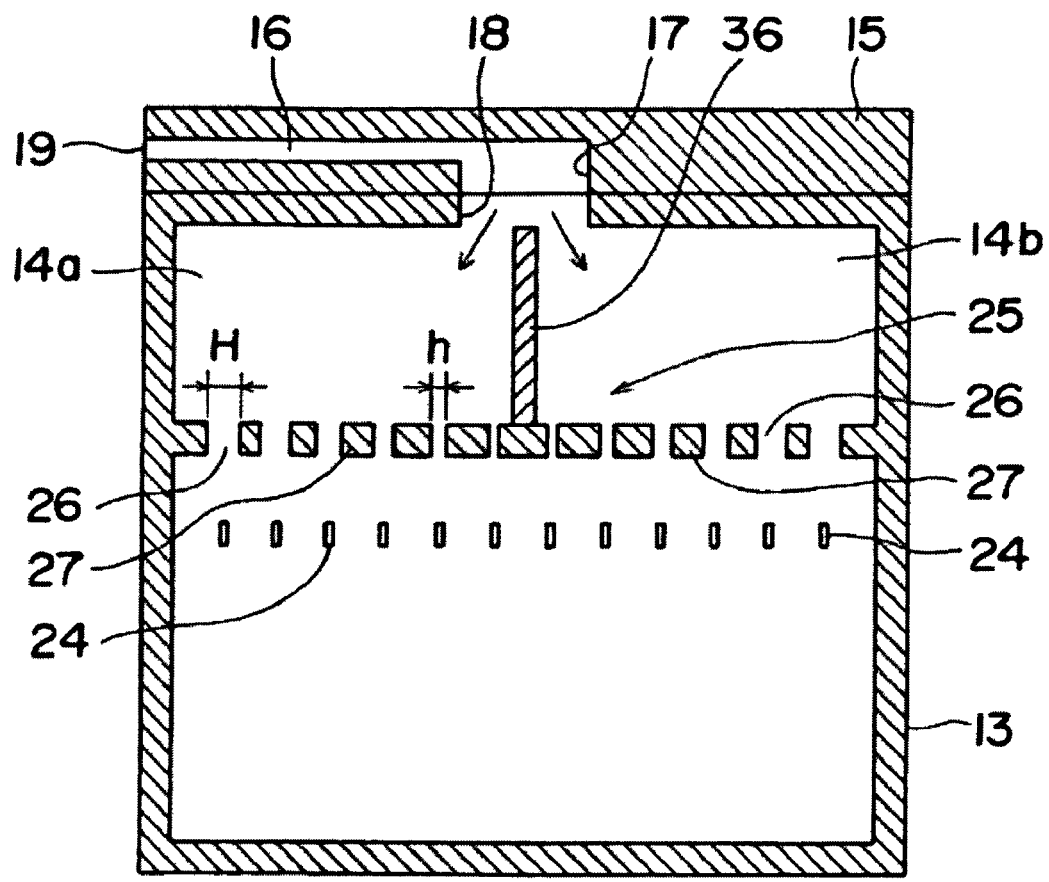
FIG. 6 is a view of the appearance of the inner face of the bottom plate of the outer manifold in a fuel cell in a third embodiment.

With reference to FIG. 6, a third embodiment is described.

FIG. 6 shows the appearance of the inner face of the bottom plate of the outer manifold in a fuel cell in the third embodiment. The members except for the bottom plate 13 are the same as those in the first embodiment, and the same members as the members for the bottom plate 13 (the first embodiment) shown in FIG. 3 are marked with the same symbols. Accordingly, overlapping descriptions are skipped.

A separator plate 36 separating the flow space 14 lying through the block group 25 on the opposite side of the small openings 24 into two spaces 14a, 14b along the direction of the arranged small openings 24 (along the left and right direction in the figure) is arranged, while the separator plate 36 is arranged at a state such that the separator plate 36 may separate the influx part 18 (the opening part 17 of the flow conduit 16) into two equal portions. In other words, the separator plate 36 can divide hydrogen fed from the opening part 17 of the flow conduit 16 into the two spaces 14a, 14b. Therefore, hydrogen can be divided into the two spaces 14a, 14b with the separator plate 36, so that hydrogen can be dispersed at a uniform state into a plurality of the small openings 24.

Herein, the separator plate 36 may be arranged on the bottom plate 13 in the second embodiment as shown in FIG. 5.

Fourth Embodiment

Figure 7:
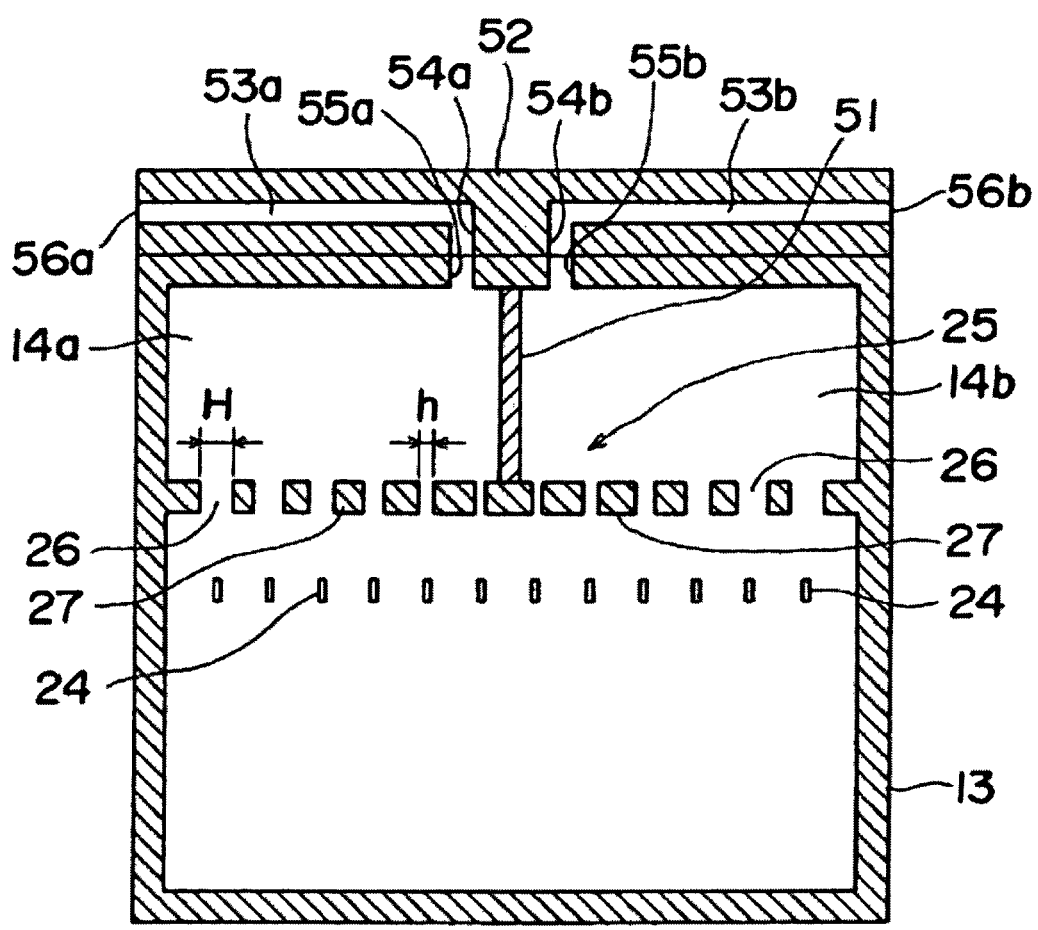
FIG. 7 is a view of the appearance of the inner face of the bottom plate of the outer manifold in a fuel cell in a fourth embodiment.

With reference to FIG. 7, a fourth embodiment is now described.

FIG. 7 shows the appearance of the inner face of the bottom plate of the outer manifold in the fuel cell in the fourth embodiment. The members except for the bottom plate 13 are the same members as in the first embodiment. The same members as the members for the bottom plate 13 shown in FIG. 3 (the first embodiment) are marked with the same symbols. Accordingly, overlapping descriptions are skipped.

A separator wall 51 separating the flow space 14 through the block group 25 on the opposite side of the small openings 24 into two spaces 14a, 14b along the direction of the small openings 24 is arranged, so that influx parts 55a, 55b are formed in a manner corresponding to the two spaces 14a, 14b on the bottom plate 13. On the side part of the bottom plate 13 on the side of the influx parts 55a, 55b along the face direction, a fluid supply plate 52 is arranged at a state such that the fluid supply plate and the bottom plate 13 are on the same face, so that flow conduits 53a, 53b are formed on the fluid supply plate 52, for feeding hydrogen from the side of the flow space 14 along the face direction into the flow space 14.

An opening part 54a in communication with the influx part 55a of the flow space 14a is arranged in the flow conduit 53a, while in the flow conduit 53b, an opening part 54b in communication with the influx part 55b of the flow space 14b is arranged. The ends of the flow conduits 53a, 53b are fuel supply ports 56a, 56b, and a fuel supply part not shown in the figure is connected with the fuel supply ports 56a, 56b. A top plate not shown in the figure is arranged over the bottom plate 13 and the fluid supply plate 52, and the flow conduits 53a, 53b are arranged between the inner face of the top plate and the upper face of the fluid supply plate 52.

In the outer manifold described above, hydrogen fed into the flow conduits 53a, 53b is transferred through the opening parts 54a, 54b and the influx parts 55a, 55b into the individual spaces 14a, 14b, which is then fed through the paths 26 in the block group 25 into the small openings 24. Hence, hydrogen is transferred into the two spaces 14a, 14b due to the separation wall 51, so that hydrogen can be dispersed securely at a uniform state in a plurality of the small openings 24.

Fifth Embodiment

Figure 8:
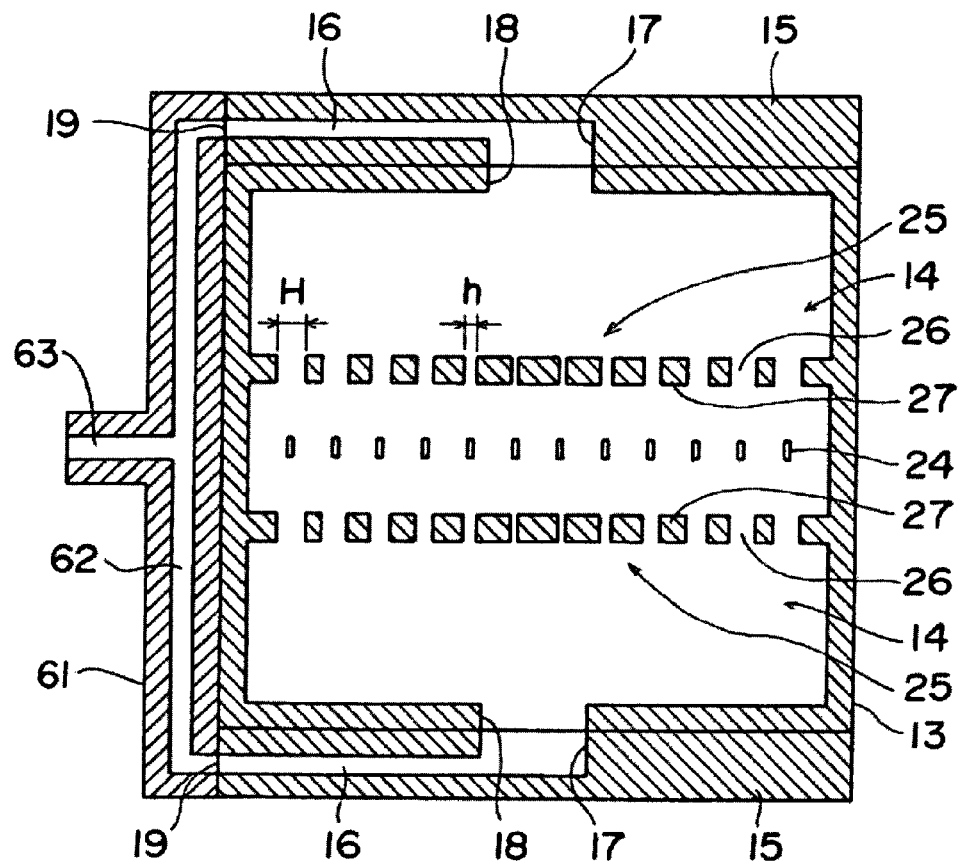
FIG. 8 is a view of the appearance of the inner face of the bottom plate of the outer manifold in a fuel cell in a fifth embodiment.

With reference to FIG. 8, a fifth embodiment is described below.

FIG. 8 shows the appearance of the inner face of the bottom plate of the outer manifold in a fuel cell in the fifth embodiment. The members except for the bottom plate 13 are the same as those in the first embodiment, and the same members as the members for the bottom plate 13 shown in FIG. 3 (the first embodiment) are marked with the same symbols. Accordingly, overlapping descriptions are skipped.

In the fifth embodiment as shown in the figure, a block group 25 is additionally arranged through the small openings 24 on the opposite side (on the opposite side along the face direction) of the block group 25 on the bottom plate in the embodiment as shown in FIG. 3. In other words, a block group 25 is additionally arranged on the lower side of the small openings 24 in the figure and faces the block group 25 on the upper side in the figure. On the lower side of the bottom plate 13 in the figure, a fluid supply plate 15 is arranged for feeding hydrogen from the paths 26 in the block groups 25 on both the sides of the small openings 24.

A conduit communication plate 61 is arranged on the side of the bottom plate 13, and a communication path 62 is formed for allowing the fuel supply ports 19 of the two fluid supply plates 15 to be in communication. Then, a fuel supply path 63 is in communication with the communication path 62. When hydrogen is fed from the fuel supply path 63, hydrogen is transferred through the communication path 62 to the fuel supply ports 19 of the two fluid supply plates 15, where hydrogen is dispersed from both the sides of the small openings 24 into the flow space 14. Hydrogen is fed from the paths 26 between the two block groups 25 into the individual small openings 24.

Therefore, the flow pressure of hydrogen into the small openings 24 between the two block groups 25 can be raised so that hydrogen can be fed stably into the small openings 24.

Sixth Embodiment

Figure 9:
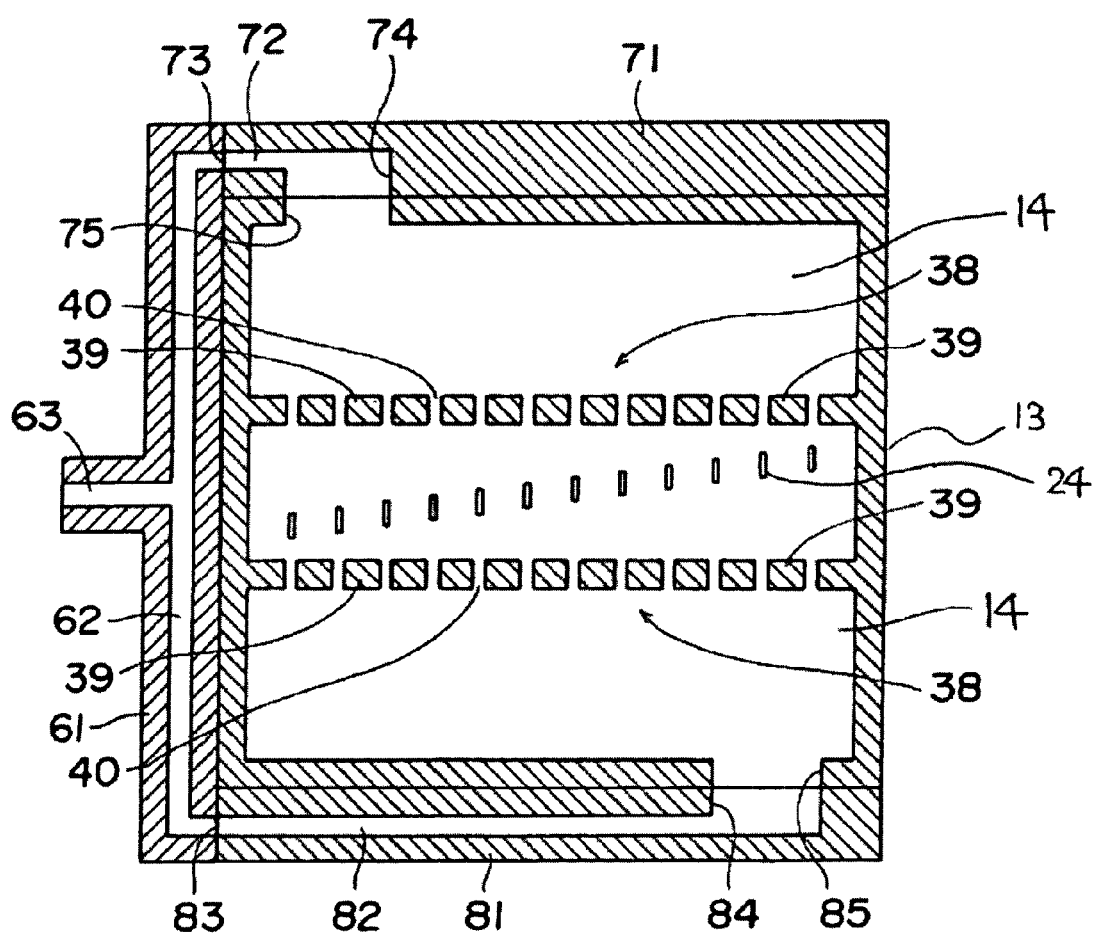
FIG. 9 is a view of the appearance of the inner face of the bottom plate of the outer manifold in a fuel cell in a sixth embodiment.

With reference to FIG. 9, a sixth embodiment is now described below.

FIG. 9 depicts the appearance of the inner face of the bottom plate of the outer manifold in a fuel cell in the sixth embodiment. Since the members except for the bottom plate 13 are the same as those in the first embodiment, the same members as those for the bottom plate 13 shown in FIG. 3 (the first embodiment) are marked with the same symbols. Accordingly, overlapping descriptions are skipped.

The sixth embodiment differs from the fifth embodiment as shown in FIG. 8, from the respects of the width of the paths in the block groups and the influx position of hydrogen on the fluid supply plate and additionally from the respect of the state of the arranged small openings. Therefore, the same members as the members in FIG. 8 are marked with the same symbols.

On both the sides of the bottom plate 13 along the face direction, fluid supply plates 71, 81 are individually arranged at a state such that the fluid supply plates and the bottom plate 13 are on the same face, while flow conduits 72, 82 are formed on the fluid supply plates 71, 81, for feeding hydrogen into the flow space 14 from both the sides of the flow space 14 (along the upper and down direction in the figure) along the face direction.

An opening part 74 with an opening on the side of the flow space 14 is arranged in the flow conduit 72, while the opening part 74 is in communication with the influx part 75 on the bottom plate 13. The end of the flow conduit 72 is a fuel supply port 73. Similarly, an opening part 84 with an opening on the side of the flow space 14 is arranged in the flow conduit 81, while the opening part 84 is in communication with the influx part 85 on the bottom plate 13. The end of the flow conduit 81 is the fuel supply port 83.

On the side part of the bottom plate 13 is arranged a conduit communication plate 61, and a communication path 62 allowing the fuel supply ports 73, 83 of two fluid supply plates 71, 81 to be in communication is formed on the conduit communication plate 61. A fuel supply path 63 is in communication with the communication path 62. When hydrogen is fed from the fuel supply path 63, specifically, hydrogen is transferred through the communication path 62 to the fuel supply ports 73, 83 of the two fluid supply plates 71, 81.

On the upper face of the bottom plate 13, a plurality of small openings 24 (12 small openings in the depicted example) facing the anode fluid path of the cell unit 11 (see FIG. 1) are formed. So as to arrange one or plural small openings 24 in one cell unit 11 (see FIG. 1), for example, the small openings 24 are arranged in an array. On the upper face of the bottom plate 13 between the influx part 75 and the small openings 24 and between the influx part 85 and the small openings 24, individual block groups 38 are formed. Paths 40 for dispersing hydrogen fed from the influx parts 75, 85 into the small openings 24 are formed with the block groups 38. A plurality of blocks 39 are arranged in the block groups 38, and the paths 40 are formed between the blocks 39. The width of the blocks 39 is structurally uniform, so that the width of the paths 40 is uniform.

The opening parts 74, 84 of the flow conduits 72, 82 through the fluid supply plates 71, 81 facing each other into the flow space 14 are arranged in an inversed direction to each other along the direction of the small openings 24 arranged (along the left and right direction in the figure). In other words, the opening part 74 of the flow conduit 72 is arranged in the vicinity of the end on the left side in the figure, while the opening part 84 of the flow conduit 82 is arranged in the vicinity of the end on the right side in the figure.

Additionally, the small openings 24 are arranged in such a manner that the micro openings 24 close to the opening parts 74, 84 of the flow conduits 72, 82 are more apart from the block groups 38 lying between the opening parts 74, 84 than the small openings 24 remote from the opening parts 74, 84. In other words, the small openings 24 are arranged at a slanting state toward the upper right in the figure.

Therefore, hydrogen is fed from the opening parts 74, 84 arranged in an inversed direction to each other along the direction of the small openings 24 arranged, so that hydrogen is fed into the small openings 24 arranged at a state slanting toward the direction apart from the opening parts 74, 84, so that the hydrogen feed distribution along the direction of the arranged small openings 24 is more highly suppressed, leading to more uniform feeding of hydrogen into the small openings 24.

Seventh Embodiment

Figure 10:
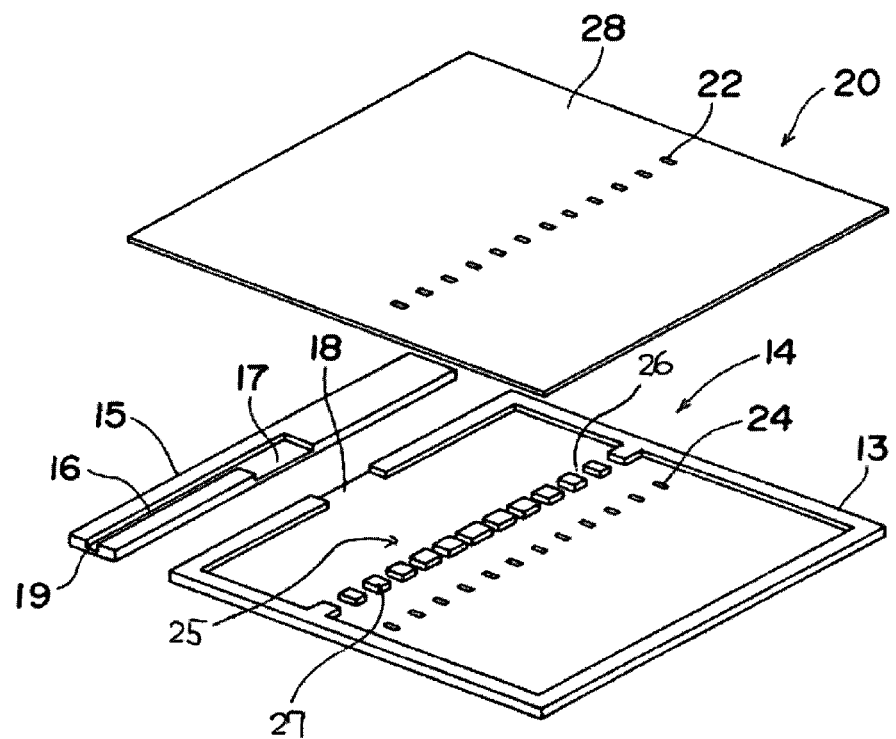
FIG. 10 is a perspective view of the decomposed outer manifold in a fuel cell in a seventh embodiment.
Figure 11:
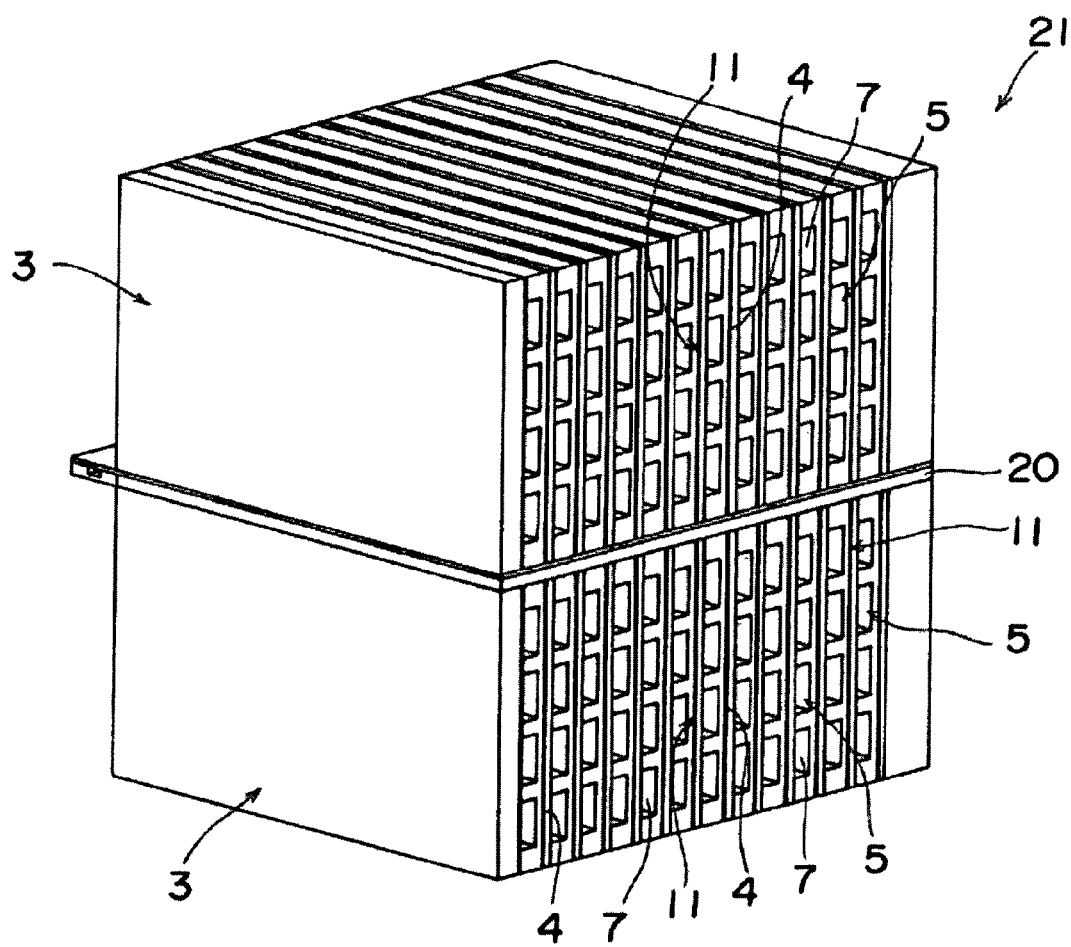
FIG. 11 is a view of the appearance of the fuel cell in the seventh embodiment.

With reference to FIGS. 10 and 11, a seventh embodiment is now described.

FIG. 10 is a perspective view of the disassembled outer manifold of a fuel cell in the seventh embodiment; and FIG. 11 depicts the appearance of a fuel cell in the seventh embodiment. Herein, the same members as those in the first embodiment (FIGS. 1 and 2) are marked with the same symbols. Therefore, overlapping descriptions are skipped.

In the embodiment as shown in the figure, an outer manifold 20 comprises small openings 22 formed through a top plate 28. The other structure is the same as that of the outer manifold shown in FIG. 2. The small openings 22 are formed in a manner corresponding to the small openings 24 arranged through the bottom plate 13. As shown in FIG. 11, additionally, individual cell stacks 3 are arranged on the lower side of the bottom plate 13 and the upper side of the top plate 28.

By applying the outer manifold 20 with the small openings 22 formed through the top plate 28, the cell stacks 3 can be arranged through the outer manifold 20 on both the sides of the outer manifold 20. An anode fluid can be fed into two cells 4 with the outer manifold 20 of a thin type.

In the embodiment, hydrogen is exemplified as an anode fluid. However, the embodiment may be applicable to the supply of other fuels including methanol.

Since an anode fluid can be dispersed into a plurality of small openings in the limited space of the manifold of a thin type, the anode fluid can be fed uniformly to each cell even when the manifold is made as such thin type.

The invention claimed is:

1. A fuel cell comprising:
a cell stack comprised of a plurality of cell units each having a cell stacked with a separator having an anode fluid path, the cell having an anode and a cathode connected together through an electrolyte membrane; and
a manifold for supplying an anode fluid to a position of each cell unit facing the anode fluid path, the manifold comprising:
a fluid supply plate having a flow conduit provided with an opening part for feeding an anode fluid;
a top plate;
a bottom plate having a plurality of openings formed in an upper surface of the bottom plate and arranged in a preselected direction so as to face the anode fluid path, the upper surface of the bottom plate forming with an inner surface of the top plate a flow space configured to receive an anode fluid fed from the opening part of the flow conduit, to reduce a flow rate of the received anode fluid, and to disperse the anode fluid at the reduced flow rate along a plane direction orthogonal to the preselected direction of arrangement of the plurality of openings; and
a block group arranged on the upper surface of the bottom plate between the plurality of openings and the opening part of the flow conduit so that the flow space is disposed between the block group and the opening part of the flow conduit, the block group comprising a plurality of blocks spaced apart from one another to form a plurality of paths for dispersing into the plurality of openings the anode fluid dispersed by the flow space at the reduced rate.

2. A fuel cell according to claim 1; wherein the top plate has a plurality of openings communicating with respective ones of the plurality of openings of the bottom plate.

3. A fuel cell according to claim 1; wherein the plurality of paths formed by the plurality of blocks includes paths disposed closer to the opening part of the flow conduit than others of the paths; and wherein a width of each path closer to the opening part of the flow conduit is smaller than the width of the others of the paths.

4. A fuel cell according to claim 1; wherein the plurality of paths formed by the plurality of blocks includes paths disposed closer to the opening part of the flow conduit than others of the paths; and wherein a length of each path closer to the opening part of the flow conduit is longer than the length of the others of the paths.

5. A fuel cell according to claim 1; further comprising a separator plate separating the flow space into a plurality of spaces providing a plurality of flow space portions into which the anode fluid is fed from the opening part of the flow conduit.

6. A fuel cell according to claim claim 1; further comprising a separator wall separating the flow space into a plurality of spaces providing a plurality of flow space portions; and wherein the opening part of the flow conduit comprises a plurality of opening parts for feeding the anode fluid to respective ones of the flow space portions.

7. A fuel cell according to claim 1; wherein the flow space comprises a first flow space, the fluid supply plate comprises a first fluid supply plate with the flow conduit and opening part comprising a first flow conduit and a first opening part, respectively, and the block group comprises a first block group with the plurality of blocks and plurality of paths comprising a plurality of first blocks and a plurality of first paths, respectively; and further comprising a second fluid supply path having a second flow conduit provided with a second opening part for feeding an anode fluid, a second flow space formed by the inner surface of the bottom plate and the inner surface of the top plate and configured to receive an anode fluid fed from the second opening part of the second fluid supply plate and to reduce a flow rate of the received anode fluid and disperse the anode fluid at the reduced flow rate along a plane direction orthogonal to the preselected direction of arrangement of the openings, and a second block group arranged on the upper surface of the bottom plate between the plurality of openings and the second opening part of the second fluid supply plate so that the second flow space is disposed between the second block group and the second opening part of the second fluid supply plate, the second block group comprising a plurality of second blocks spaced apart from one another to form a plurality of second paths for dispersing into the plurality of openings the anode fluid dispersed by the second flow space at the reduced rate.

8. A fuel cell according to claim 7; wherein the first opening part of the first flow conduit and the second opening part of the second flow conduit are arranged diagonally opposite one another across the plurality of openings.

9. A fuel cell according to claim 8; wherein the plurality of openings includes openings closer to respective ones of the first and second openings parts than others of the openings; wherein the openings closer to the first opening part are disposed closer to the second block group than to the first block group; and wherein the openings closer to the second opening part are disposed closer to the first block group than to the second block group.

10. A fuel cell according to claim 1; further comprising a plurality of openings arranged on the top plate so as to face the anode fluid path; and wherein the cell stacks are individually arranged on a bottom part of the bottom plate and a top part of the top plate.

11. A fuel cell comprising:
a plurality of cell units; and
a manifold for uniformly supplying an anode fluid to the cell units, the manifold having a fluid supply plate formed with a flow conduit for feeding an anode fluid and a plate structure including a plurality of openings arranged in a preselected direction, a flow space and a block group, the flow space being configured to receive an anode fluid fed from an opening part of the flow conduit, to reduce a flow rate of the received anode fluid, and to disperse the anode fluid at the reduced flow rate along a plane direction orthogonal to the preselected direction of arrangement of the plurality of openings, the block group being arranged between the plurality of openings and the opening part of the flow conduit so that the flow space is disposed between the block group and the opening part of the flow conduit, the block group comprising a plurality of blocks spaced apart from one another to form a plurality of paths for dispersing into the plurality of openings the anode fluid dispersed by the flow space at the reduced rate.

12. A fuel cell according to claim 11; wherein the plurality of paths formed by the plurality of blocks includes paths disposed closer to the opening part of the flow conduit than others of the paths; and wherein a width of each path closer to the opening part of the flow conduit is smaller than the width of the others of the paths.

13. A fuel cell according to claim 12; wherein a length of each path closer to the opening part of the flow conduit is longer than the length of the other of the plurality of paths.

14. A fuel cell according to claim 11; wherein the plurality of paths formed by the plurality of blocks includes paths disposed closer to the opening part of the flow conduit than others of the paths; and wherein a length of each path closer to the opening part of the flow conduit is longer than the length of the others of the paths.

15. A fuel cell according to claim 11; further comprising a separator plate separating the flow space into a plurality of spaces providing a plurality of flow space portions into which the anode fluid is fed from the opening part of the flow conduit.

16. A manifold for uniformly supplying an anode fluid to a plurality of cell units, the manifold comprising:
a fluid supply plate having a flow conduit for feeding an anode fluid;
a plate structure having a plurality of openings arranged in a preselected direction and a flow space configured to receive an anode fluid fed from an opening part of the flow conduit, to reduce a flow rate of the received anode fluid, and to disperse the anode fluid at the reduced flow rate along a plane direction orthogonal to the preselected direction of arrangement of the plurality of openings; and
a block group arranged on the plate structure between the plurality of openings and the opening part of the flow conduit so that the flow space is disposed between the block group and the opening part of the flow conduit, the block group comprising a plurality of blocks spaced apart from one another to form a plurality of paths for dispersing into the plurality of openings the anode fluid dispersed by the flow space at the reduced rate.

17. A manifold according to claim 16; wherein the plurality of paths formed by the plurality of blocks includes paths disposed closer to the opening part of the flow conduit than others of the paths; and wherein a width of each path closer to the opening part of the flow conduit is smaller than the width of the others of the paths.

18. A fuel cell according to claim 17; wherein a length of each path closer to the opening part of the flow conduit is longer than the length of the other of the plurality of paths.

19. A manifold according to claim 16; wherein the plurality of paths formed by the plurality of blocks includes paths disposed closer to the opening part of the flow conduit than others of the paths; and wherein a length of each path closer to the opening part of the flow conduit is longer than the length of the others of the paths.

20. A manifold according to claim 16; further comprising a separator plate separating the flow space into a plurality of spaces providing a plurality of flow space portions into which the anode fluid is fed from the opening part of the flow conduit.

* * * * *